Apr. 24, 1923.
J. H. McCORMICK
VEHICLE TIRE
Filed Nov. 11, 1920
1,453,150
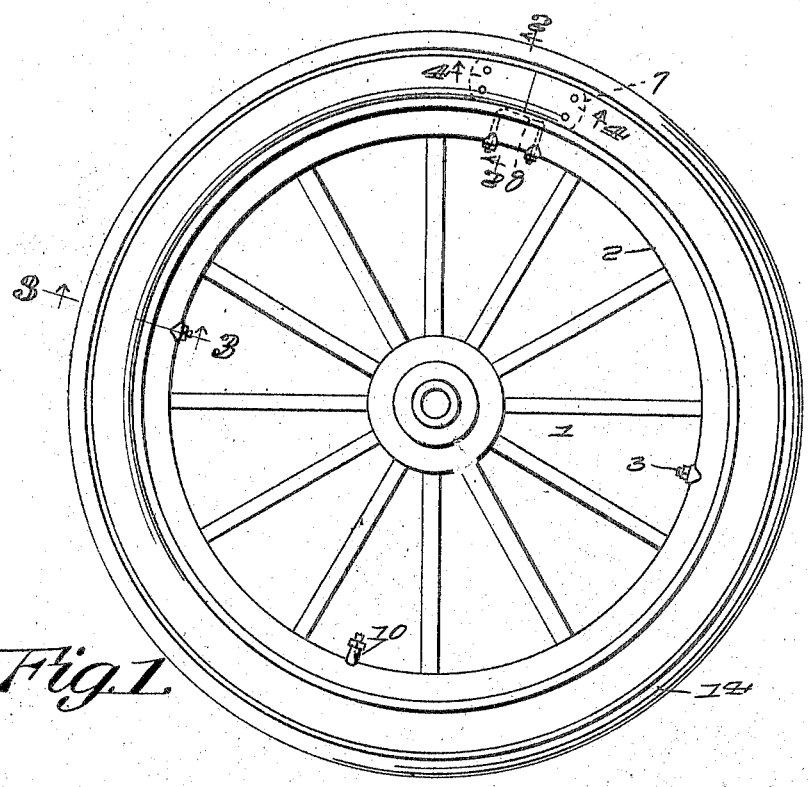
Fig. 1
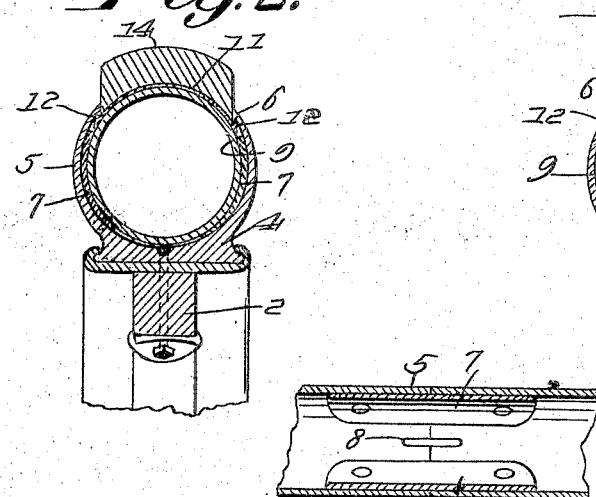
Fig. 2.   Fig. 3.
Fig. 4.
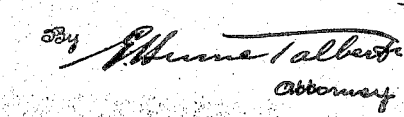
J. H. McCormick,
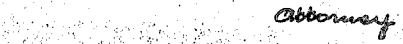

Patented Apr. 24, 1923.

1,453,150

UNITED STATES PATENT OFFICE.

JOSEPH HENRY McCORMICK, OF SOUTH PITTSBURG, TENNESSEE.

VEHICLE TIRE.

Application filed November 11, 1920. Serial No. 423,289.

*To all whom it may concern:*

Be it known that I, JOSEPH HENRY MC-CORMICK, a citizen of the United States of America, residing at South Pittsburg, in the county of Marion and State of Tennessee, have invented new and useful Improvements in Vehicle Tires, of which the following is a specification.

The object of the invention is to provide an improved construction of vehicle tire of the double tube type of which the outer tube or casing is of metal and provided with a detachable section carrying a cushion tread, the tread section interlocking with the main portion of the casing. The inner tube is of the ordinary character of inner tube used with pneumatic tires and when inflated serves to hold the tread section and the remainder of the outer casing in their interlocked positions.

The invention is illustrated and described in a specific embodiment to which, however, it is not to be restricted. The right is reserved to make such changes or alterations as may be suggested by actual reduction to practice, in so far as such changes or alterations are compatible in spirit with the annexed claim.

In the accompanying drawings:—

Figure 1, is a side elevational view of a wheel equipped with the improved tire.

Figure 2, is a section on the line 2—2 of Figure 1.

Figure 3, is a section on the line 3—3 of Figure 1.

Figure 4, is a section on the line 4—4 of Figure 1.

The invention is adapted for use with the usual form of wheel 1, being secured to the felly 2 thereof by means of bolts 3 which are radially disposed and pass through the felly to receive appropriate fastening nuts set against the inner face of the felly. Following the general construction of the usual double tube pneumatic tire, the improved tire consists of a metallic outer casing made of metal and formed with the base 4 through which the bolts pass, the latter being preferably of the flat head type set in counter sunk holes formed in the base, so that the heads may lie flush with the inner surface of the outer casing. The side walls 5 of the outer casing are inturned to provide locking tongues or flanges 6 which are continuous around the casing and the connecting ends of the latter are spanned by the plates 7 oppositely disposed and riveted or otherwise secured to the side walls 5. At the point of juncture the two ends of the base of the outer casing are straddled by the U-bolt 8, the legs of which pass through the felly to receive appropriate nuts to secure the U-bolt in place.

The inner tube 9 in a collapsed condition is placed in the outer casing through the open space between the side walls 5 thereof and its valve 10 is passed through an appropriate hole to make the valve accessible for inflating the inner tube. The inner tube, however, is not inflated until the tread portion of the outer casing is attached and this tread portion consists of a base plate 11 shaped to both the cross sectional and circumferential contour of the tire and provided with continuous marginal beads or hook elements 12 adapted for engagement with the inturned hook like flanges 6 of the main portion of the outer casing. The base plate 11 carries a continuous resilient tread portion 14 made preferably of rubber.

In attaching the tread section to the main body portion of the outer casing, the latter is flexed transversely to permit its insertion through the open side of the outer casing so that the beads may engage with the inturned flanges thereof. The inner tube is then inflated, whereupon pressure is exerted upon the base plate of the tread section and the latter is maintained in place. Proper inflation may be determined by hitting the tread portion 14 with a hammer, the rebound of the hammer indicating the intensity of the pressure in the inner tube. Obviously a great pressure of air in the inner tube will not permit as great yielding of the tread portion 14 as would be the case with the pressure in the inner tube within the desired limits.

Having described the invention, what I claim as new and useful is:—

A double tube tire having an outer casing consisting of a split cross sectionally U- shaped element for disposition in surrounding relation to the felly of a wheel, a U-bolt spanning the connecting edges of the outer casing for the passage of its legs through the felly to receive nuts to hold it in engagement with the same, plates spanning the connecting edges of the side walls of the outer casing and secured to the same, a tread section surrounding and engaging with the outer section, and an inflatable tube carried in the outer section and embraced by the latter and the tread section.

In testimony whereof he affixes his signature.

JOSEPH HENRY McCORMICK.